US009814127B2

(12) United States Patent
Imai et al.

(10) Patent No.: US 9,814,127 B2
(45) Date of Patent: Nov. 7, 2017

(54) LIQUID TREATMENT DEVICE AND LIQUID TREATMENT METHOD

(71) Applicant: Panasonic Intellectual Property Management Co., Ltd., Osaka (JP)

(72) Inventors: Shin-ichi Imai, Osaka (JP); Hironori Kumagai, Osaka (JP); Mari Onodera, Osaka (JP)

(73) Assignee: Panasonic Intellectual Property Management Co., Ltd., Osaka (JP)

( * ) Notice: Subject to any disclaimer, the term of this patent is extended or adjusted under 35 U.S.C. 154(b) by 279 days.

(21) Appl. No.: 14/575,560

(22) Filed: Dec. 18, 2014

(65) Prior Publication Data

US 2015/0102255 A1 Apr. 16, 2015

Related U.S. Application Data

(63) Continuation of application No. PCT/JP2014/002140, filed on Apr. 15, 2014.

(30) Foreign Application Priority Data

Apr. 18, 2013 (JP) ................................ 2013-087685

(51) Int. Cl.
*H05H 1/48* (2006.01)
*C02F 1/46* (2006.01)
(Continued)

(52) U.S. Cl.
CPC .............. *H05H 1/48* (2013.01); *B01J 19/088* (2013.01); *B01J 19/2465* (2013.01);
(Continued)

(58) Field of Classification Search
CPC ...... H05H 1/44; H05H 1/48; H05H 2001/466; H05H 2001/2412; C02F 1/4608;
(Continued)

(56) References Cited

U.S. PATENT DOCUMENTS 8,607,732 B2 12/2013 Shibata et al.
2002/0014400 A1 2/2002 Zadiraka et al.
(Continued)

FOREIGN PATENT DOCUMENTS

CN 102897892 A 1/2013
EP 2072471 A1 6/2009
(Continued)

OTHER PUBLICATIONS

English Translation of the International Preliminary Report on Patentability and Written Opinion issued in International Application No. PCT/JP2014/002140, dated Oct. 29, 2015.
(Continued)

*Primary Examiner* — Kishor Mayekar
(74) *Attorney, Agent, or Firm* — McDermott Will & Emery LLP

(57) ABSTRACT

The present disclosure provides a liquid treatment device and a liquid treatment method each capable of efficiently generating plasma and treating a liquid in a short time period. A liquid treatment device according to the present disclosure includes a first electrode, a second electrode disposed in a liquid, an insulator disposed surrounding the first electrode through a space, the insulator having an opening portion at a position in contact with the liquid, and a power supply that applies an AC voltage or a pulse voltage between the first electrode and the second electrode.

17 Claims, 10 Drawing Sheets

(51) Int. Cl.

| | |
|---|---|
| ***B01J 19/08*** | (2006.01) |
| ***B01J 19/24*** | (2006.01) |
| ***H05H 1/24*** | (2006.01) |
| ***H05H 1/46*** | (2006.01) |
| *C02F 1/467* | (2006.01) |
| *C02F 1/461* | (2006.01) |
| *C02F 103/00* | (2006.01) |
| *C02F 103/02* | (2006.01) |

(52) U.S. Cl.

CPC ......... *C02F 1/4608* (2013.01); *H05H 1/2406* (2013.01); *H05H 1/46* (2013.01); *B01J 2219/00186* (2013.01); *B01J 2219/0809* (2013.01); *B01J 2219/0815* (2013.01); *B01J 2219/0841* (2013.01); *B01J 2219/0877* (2013.01); *B01J 2219/0894* (2013.01); *C02F 1/4672* (2013.01); *C02F 2001/46138* (2013.01); *C02F 2103/002* (2013.01); *C02F 2103/005* (2013.01); *C02F 2103/023* (2013.01); *C02F 2201/46* (2013.01); *C02F 2201/4613* (2013.01); *C02F 2201/4614* (2013.01); *C02F 2201/46135* (2013.01); *H05H 2001/2412* (2013.01); *H05H 2001/466* (2013.01)

(58) Field of Classification Search

CPC .......... C02F 1/4672; C02F 2001/46138; C02F 2201/46; C02F 2201/4614; C02F 2201/4613; C02F 2201/46135; C02F 2103/002; C02F 2103/005; C02F 2103/023; B01J 18/088; B01J 19/24675; B01J 2219/0809; B01J 2219/00186; B01J 2219/0815; B01J 2219/0841; B01J 2219/0877; B01J 2219/0894

See application file for complete search history.

(56) References Cited

U.S. PATENT DOCUMENTS

| | | | | |
|---|---|---|---|---|
| 2011/0229656 | A1 | 9/2011 | Shibata et al. | |
| 2012/0048792 | A1 | 3/2012 | Saitou et al. | |
| 2013/0098753 | A1 | 4/2013 | Sanematsu | |
| 2013/0152982 | A1 | 6/2013 | Tanaka et al. | |
| 2013/0334955 | A1* | 12/2013 | Saitoh .................... | A45D 27/46 313/231.31 |
| 2014/0014516 | A1 | 1/2014 | Kumagai et al. | |
| 2014/0054242 | A1 | 2/2014 | Imai | |

FOREIGN PATENT DOCUMENTS

| | | | |
|---|---|---|---|
| JP | 2005-058887 | * | 3/2005 |
| JP | 2007-207540 | A | 8/2007 |
| JP | 2009-235559 | A | 10/2009 |
| JP | 2009-255027 | A | 11/2009 |
| JP | 2012-043769 | A | 3/2012 |
| JP | 2012-061152 | A | 3/2012 |
| JP | 2012-075981 | A | 4/2012 |
| WO | 2010-131429 | A1 | 11/2010 |
| WO | 2012-011332 | A1 | 1/2012 |
| WO | WO 2012/132596 | * | 10/2012 |
| WO | 2012/157034 | A1 | 11/2012 |

OTHER PUBLICATIONS

Chinese Office Action issued in Chinese Application No. 201480001535.9 dated Jul. 20, 2015, with Partial English Translation.

Japanese Office Action issued in Japanese Application No. 2014-543706, dated Jan. 6, 2015.

English translation of International Search Report issued in PCT/JP2014/002140, dated Jul. 22, 2014.

* cited by examiner

LIQUID TREATMENT DEVICE AND LIQUID TREATMENT METHOD

CROSS-REFERENCE

This is a continuation application of International Application No. PCT/JP2014/002140, with an international filing date of Apr. 15, 2014, which claims priority of Japanese Patent Application No. 2013-087685 filed on Apr. 18, 2013, the content of which is incorporated herein by reference.

DESCRIPTION OF THE RELATED ART

The present disclosure relates to a plasma generating apparatus and a liquid treatment method that treat a liquid, especially, water by generating plasma in the liquid.

The conventional liquid treatment device using a high voltage pulse discharge is disclosed in Patent Literature 1 (Japanese Patent Laid-open Publication No. 2009-255027). The traditional liquid treatment device (a sterilization device) is described below with reference to FIG. 10. The sterilization device 1 shown in FIG. 10 includes a discharging electrode 6 that is made by a pair of a rod-shaped high voltage electrode 2 having a diameter of 0.05 to 0.5 mm and a plate-shaped ground electrode 3. The high voltage electrode 2 is covered with an insulator 4 except an end face of a tip 2*a* thereof forming a high voltage electrode portion 5. The tip 2*a* of the high voltage electrode 2 and the ground electrode 3 are disposed facing each other, providing a predetermined electrode interval therebetween and immersed in water being treated 8 in a treatment tank 7. The high voltage electrode 2 and the ground electrode 3 are connected to a power supply 9 that generates high voltage pulses. The negative high voltage pulses having 2 to 50 kV and 100 Hz to 20 kHz are applied between the two electrodes to cause a discharge therebetween. Bubbles 10 including steam are generated due to evaporation of the water caused by the energy of the discharge and vaporization associated with the shock waves. OH, H, O, $O_2^-$, $O^-$, and $H_2O_2$ are generated by the plasma generated in the vicinity of the high voltage electrode 2 to sterilize microorganisms and bacteria.

SUMMARY

However, in the conventional device, there has had problem that the plasma generation efficiency is low, and it takes a long time to treat a liquid.

Therefore, one non-limiting and exemplary embodiment provides a liquid treatment device and a liquid treatment method each capable of efficiently generating plasma and treating a liquid in a short time period.

In one general aspect, a liquid treatment device includes:

a first electrode;

a second electrode disposed in a liquid;

an insulator disposed surrounding the first electrode through a space, the insulator having an opening portion at a position in contact with the liquid; and a power supply that applies an AC voltage or a pulse voltage between the first electrode and the second electrode.

In one general aspect, a liquid treatment device includes:

a first electrode;

a second electrode disposed in a liquid;

an insulator disposed surrounding the first electrode through a space, the insulator having an opening portion at a position in contact with the liquid; and a power supply that applies a voltage between the first electrode and the second electrode, wherein a gas is generated by vaporizing the liquid in the space by applying the voltage between the first electrode and the second electrode by the electric power supply, and wherein plasma is generated by causing an electric discharge when the gas is released from the opening portion into the liquid.

In one general aspect, a liquid treatment method includes:

generating a gas by vaporizing a liquid in a space formed between a first electrode and an insulator disposed surrounding the first electrode and comprising an opening portion to be in contact with the liquid, by applying a voltage between the first electrode and a second electrode disposed in the liquid; and generating plasma in the gas by an electric discharge in the gas caused when the gas is released from the opening portion disposed in the insulator into the liquid.

In one general aspect, plasma treated water includes OH radicals in a liquid generated by energizing the liquid, present at 1.0 μM to 2.4 μM even after the energizing is stopped.

The above schematic and specific aspects may be realized by the liquid treatment device, the liquid treatment method, and an arbitrary combination of the liquid treatment device and the liquid treatment method.

The liquid treatment device and the liquid treatment method according to the present disclosure are capable of treating a liquid in a short time by generating plasma effectively.

Additional benefits and advantages of the disclosed embodiments will be apparent from the specification and Figures. The benefits and/or advantages may be individually provided by the various embodiments and features of the specification and drawings disclosure, and need not all be provided in order to obtain one or more of the same.

DETAILED DESCRIPTION

Figure 1:
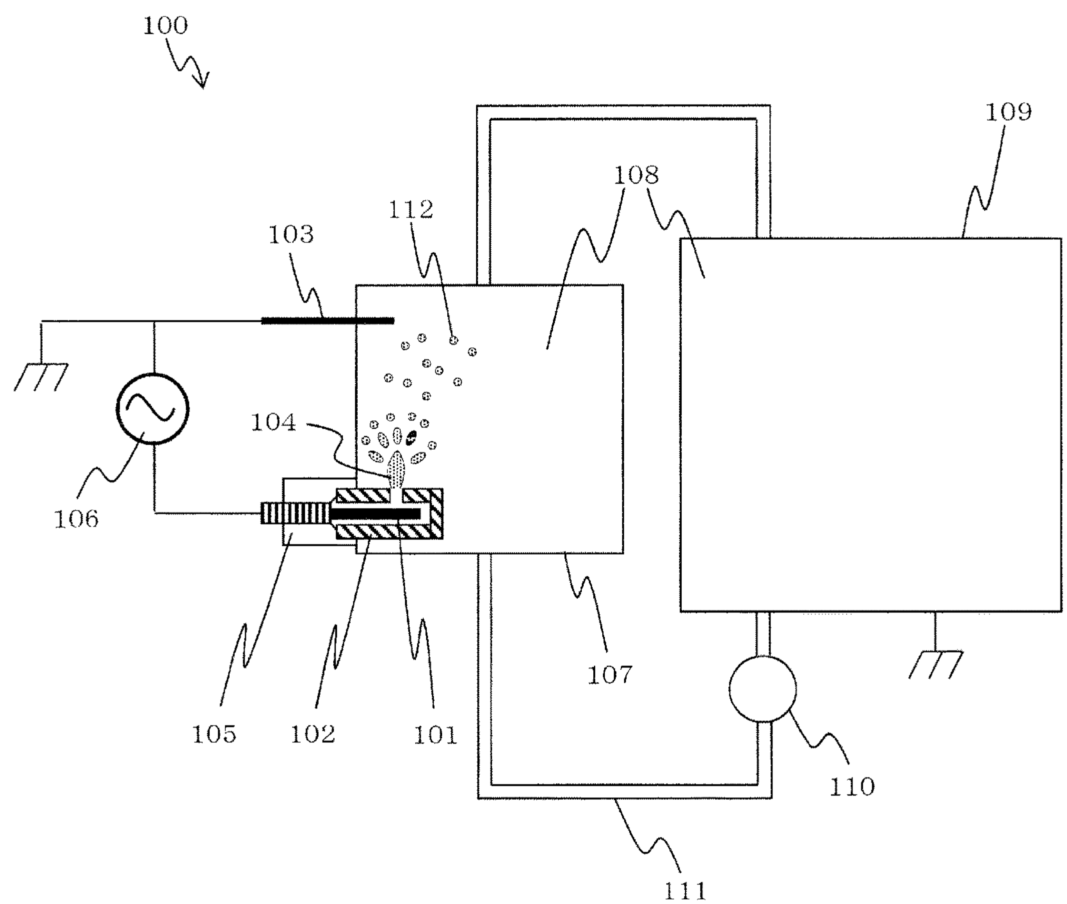
FIG. 1 is a schematic diagram of an overall configuration of a liquid treatment device according to a first embodiment of the present disclosure.

A liquid treatment device according to a first aspect of the present disclosure includes:

a first electrode;

a second electrode disposed in a liquid;

an insulator disposed surrounding the first electrode through a space, the insulator having an opening portion at a position in contact with the liquid; and a power supply that applies an AC voltage or a pulse voltage between the first electrode and the second electrode.

According to this configuration, plasma can efficiently be generated and long-life OH radicals can also be generated as compared to the conventional device. Therefore, the liquid can be treated in a short time period. No limit is imposed on the distance between the first electrode and the second electrode and, therefore, the second electrode can be disposed at an arbitrary position in the liquid. The diameter of the first electrode can be increased as compared to the electrode in the conventional device and, therefore, the durability of the electrode can be improved.

A liquid treatment device according to a second aspect of the present disclosure includes:

a first electrode;

a second electrode disposed in a liquid;

an insulator disposed surrounding the first electrode through a space, the insulator having an opening portion at a position in contact with the liquid; and a power supply that applies a voltage between the first electrode and the second electrode, wherein a gas is generated by vaporizing the liquid in the space by applying the voltage between the first electrode and the second electrode by the electric power supply, and wherein plasma is generated by causing an electric discharge when the gas is released from the opening portion into the liquid.

According to this configuration, the gas is generated from the opening portion of the insulator into the liquid by vaporizing the liquid in the space formed between the first electrode and the insulator. Purer OH radicals can be generated by generating the plasma in the liquid. As a result, the liquid can be treated in a short time period.

In a liquid treatment device according to a third aspect of the present disclosure, the opening portion in the first aspect has a diameter in a range from 0.3 mm to 2 mm.

According to this configuration, an efficient discharge is enabled by concentrating the electric field in the vicinity of the opening portion. As a result, the plasma can efficiently be generated from the vicinity of the opening portion.

In a liquid treatment device according to a fourth aspect of the present disclosure, the opening portion in the first aspect is arranged such that its opening orientation is upward in a vertical direction for a side face of the insulator.

According to this configuration, bubble clogging caused by the bubbles around the opening portion can be prevented and, therefore, the plasma can efficiently be generated.

In a liquid treatment device according to a fifth aspect of the present disclosure, a plurality of opening portions in the first aspect are arranged at the insulator.

According to this configuration, the plasma can be generated from the plurality of the opening portions and, therefore, the plasma can more efficiently be generated.

In a liquid treatment device according to a sixth aspect of the present disclosure, an end of each of the first electrode and the insulator in the first aspect includes a sealing structure.

According to this configuration, any leakage of the liquid is prevented at the end of the connection between the first electrode and the insulator, and gas blocks are released only from the opening portion of the insulator. As a result, the plasma can efficiently be generated.

In a liquid treatment device according to a seventh aspect of the present disclosure, the sealing structure in the sixth aspect is a screw clamp structure.

According this configuration, any leakage of the liquid can securely be prevented at the end of the connection between the first electrode and the insulator.

In a liquid treatment device according to an eighth aspect of the present disclosure, the power supply in the first aspect supplies a current having a current value of lower than or equal to 3 A.

According to this configuration, the liquid can be vaporized only in the space formed between the first electrode and the insulator, and the plasma can be efficiently generated with low electric power consumption.

In a liquid treatment device according to a ninth aspect of the present disclosure, the elemental analysis device in the first aspect further includes a reaction tank that the first electrode and the second electrode are disposed.

According to this configuration, a more usable liquid treatment device can be provided.

In a liquid treatment device according to a tenth aspect of the present disclosure, the elemental analysis device in the ninth aspect further includes a treatment tank that is connected to the reaction tank by a circulating pump and a pipe.

According to this configuration, the capacity of the liquid that the liquid treatment device can treat the liquid can be increased.

In a liquid treatment device according to an eleventh aspect of the present disclosure, the treatment tank in the tenth aspect is grounded.

According to this configuration, any electrification can be prevented.

In a liquid treatment device according to a twelfth aspect of the present disclosure, the treatment tank in the ninth aspect is one selected from a group of a water clarification device, an air-conditioner, a humidifier, a washing machine, an electric razor washer, a dish washer, a lavatory basin, and a hydroponic culture water and nourishing solution circulation tank.

According to this configuration, various electric appliances, etc., can be provided each supplying the liquid that is treated by the liquid treatment device of the present disclosure.

In a liquid treatment device according to a thirteenth aspect of the present disclosure, the liquid treatment device in the first aspect includes the plurality of liquid treatment device.

According to this configuration, employing the configuration to treat the liquid using the plurality of the liquid treatment devices enables the treatment of a large volume of liquid to be in a short time period.

In a liquid treatment device according to a fourteenth aspect of the present disclosure, the liquid treatment device in the thirteenth aspect further includes a plurality of reaction tanks that the first electrode and the second electrode are disposed in each reaction tank.

According to this configuration, the liquid in the plurality of the reaction tanks can concurrently be treated and, therefore, the liquid can be treated in a short time period and a usable liquid treatment device can be provided.

In a liquid treatment device according to a fifteenth aspect of the present disclosure, the liquid treatment device in the fourteenth aspect further includes a treatment tank that is connected to the plurality of reaction tanks by a plurality of circulating pumps and a plurality of pipes.

According to this configuration, the liquid can be treated by the plural liquid treatment devices connected to the large-volume treatment tank and, therefore, a larger volume of liquid can be treated in a short time period.

In a liquid treatment device according to a sixteenth aspect of the present disclosure, the treatment tank in the fifteenth aspect is grounded.

According to this configuration, any electrification can be prevented.

In a liquid treatment device according to a seventeenth aspect of the present disclosure, the treatment tank in the fifteenth aspect is one selected from a group of a water clarification device, an air-conditioner, a humidifier, a washing machine, an electric razor washer, a dish washer, a lavatory basin, and a hydroponic culture water and nourishing solution circulation tank.

According to this configuration, various electric appliances, etc., can be provided each supplying the liquid treated using the plurality of the liquid treatment devices of the present disclosure.

A liquid treatment method according to an eighteenth aspect of the present disclosure includes:

generating a gas by vaporizing a liquid in a space formed between a first electrode and an insulator by applying a voltage between the first electrode and a second electrode disposed in the liquid, the insulator disposed surrounding the first electrode and having an opening portion to be in contact with the liquid; and generating plasma in the gas by an electric discharge in the gas caused when the gas is released from the opening portion arranged at the insulator into the liquid.

As above, when the gas is generated by vaporizing the liquid in the space formed by the first electrode and the insulator and the gas is released from the opening of the insulator, a discharge is caused in the gas and, thereby, the plasma is efficiently generated. The gas is generated by vaporizing the liquid and, therefore, purer OH radicals can be generated. As a result, the liquid can be treated in a short time period.

In plasma treated water according to a nineteenth aspect of the present disclosure includes OH radicals in a liquid generated by energizing the liquid, present at 1.0 μM to 2.4 μM even after the energizing is stopped.

As above, the plasma treated water of the present disclosure can efficiently decompose the substance to be decomposed even after the energizing is stopped.

In plasma treated water according to a twentieth aspect of the present disclosure, the liquid in the nineteenth aspect includes hydrogen peroxide, and a concentration of the hydrogen peroxide is $0.2\times10^{-7}$ to $0.6\times10^{-5}$.

As above, the plasma treated water of the present disclosure includes hydrogen peroxide water and the concentration of the hydrogen peroxide is $0.2\times10^{-7}$ to $0.6\times10^{-5}$ M and, thereby, the OH radicals can efficiently be generated.

In plasma treated water according to a twenty-first aspect of the present disclosure, plasma in the twentieth aspect is generated in the liquid by the energizing.

As above, according to the plasma treated water of the present disclosure, the plasma is generated in the liquid and, thereby, the OH radicals can efficiently be generated.

(Circumstances Leading to One Embodiment According to the Present Disclosure)

Figure 10:
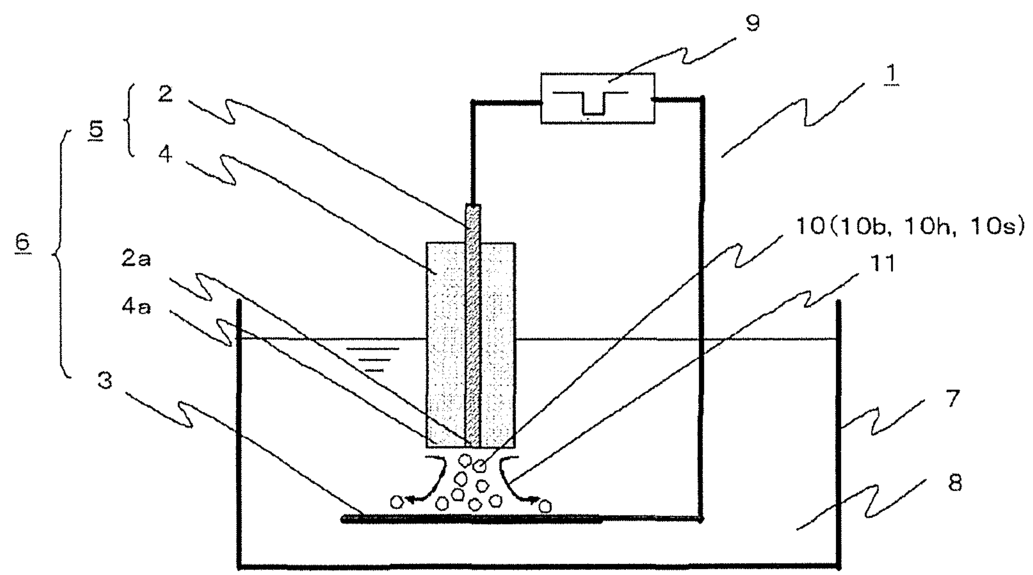
FIG. 10 is a schematic diagram of an overall configuration of a sterilization device using a traditional high voltage pulse discharge.

As has been described in the section "DESCRIPTION OF THE RELATED ART", according to the sterilization device of Patent Literature 1 shown in FIG. 10, there has had a problem that the plasma generation efficiency is low, and it takes a long time to treat a liquid. There has had another problem that the liquid cannot be vaporized when the high voltage electrode 2 covered with the insulator 4 and the ground electrode 3 are not disposed to be close to each other at the predetermined distance of 1 to 50 mm, and therefore plasma cannot be generated. Furthermore, according to the device of Patent Literature 1, there has had a problem that the diameter of the electrode needs to be thin to be 0.05 to 0.5 mm to generate the plasma and, therefore, the durability of the electrode is low.

A liquid treatment device includes a gas supply device supplying a gas into a liquid to generate plasma. According to this liquid treatment device, the gas (such as air) is supplied by the gas supply device and, thereby, bubbles are generated in the liquid and a discharge is caused in the bubbles. Thereby, the plasma is generated. However, according this device, nitrogen oxide, etc., are generated by the gas and, therefore, there has had a problem that it is difficult to generate purer OH radical.

The inventors find a configuration to generate plasma by disposing a space filled with the liquid between the first electrode and the insulator, generating the gas by vaporizing the liquid in the space, and causing a discharge when the gas is released from an opening portion disposed in the insulator, and the inventors established the present disclosure.

Embodiments of the present disclosure will be described below with reference to the accompanying drawings. In all the drawings below, the same or corresponding parts are given the same reference numerals and are not again be described.

First Embodiment

[Overall Configuration]

An overall configuration of a liquid treatment device 100 according to a first embodiment of the present disclosure is described.

FIG. 1 is a schematic diagram of an overall configuration of the liquid treatment device 100 according to the first embodiment of the present disclosure. As shown in FIG. 1, the liquid treatment device 100 according to the first embodiment includes a first metal electrode 101, a second metal electrode 103, an insulator 102, and a power supply 106. The liquid treatment device 100 according to the first embodiment may further include a reaction tank 107 and a treatment tank 109. In the first embodiment below, the description is made for the liquid treatment device 100 that includes the reaction tank 107 and the treatment tank 109, and the reaction tank 107 and the treatment tank 109 are connected to each other by a circulating pump 110 and a pipe 111.

As shown in FIG. 1, the reaction tank 107 and the treatment tank 109 are filled with a liquid being treated 108. The reaction tank 107 and the treatment tank 109 are connected to each other by the circulating pump 110 and the pipe 111. At one wall of the reaction tank 107, the second metal electrode 103 penetrating the wall and the first metal electrode 101 attached to a holding block 105 are disposed. A portion of each of the first metal electrode 101 and the second metal electrode 103 is positioned in the reaction tank 107. The insulator 102 including an opening portion 113 is disposed around the first metal electrode 101 such that a space 114 is formed. The power supply 106 is disposed between the first metal electrode 101 and the second metal electrode 103.

[Electrode Configuration]

An electrode configuration in the liquid treatment device 100 according to the first embodiment is described. An electrode in the first embodiment includes the first metal electrode 101, the insulator 102, the second metal electrode 103, and the holding block 105.

Figure 2:
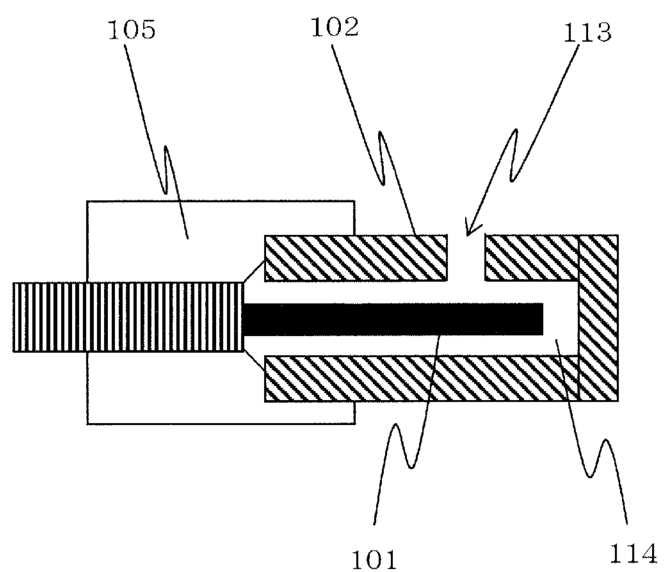
FIG. 2 is a cross-sectional diagram of an electrode configuration around a first metal electrode in the first embodiment of the present disclosure.

FIG. 2 is a cross-sectional diagram of the electrode configuration around the first metal electrode 101 in the first embodiment. As shown in FIG. 2, the insulator 102 is disposed around the first metal electrode 101 such that the space 114 is formed. The insulator 102 includes at least one opening portion 113 such that the inside of the reaction tank 107 and the space 114 communicate with each other. The device 100 is configured such that the liquid 108 in the reaction tank 107 enters the space 114 from the opening portion 113 and the space 114 is filled with the liquid 108. An end of each of the first metal electrode 101 and the insulator 102 is fixed to the holding block 105. The second metal electrode 103 may be disposed at any position in the reaction tank 107, and the position to be disposed may be not limited.

The components in the first embodiment are described.

<First Metal Electrode>

At least a part of the first metal electrode 101 is disposed in the reaction tank 107 into which the liquid 108 is filled. An end of the first metal electrode 101 is fixed to the holding block 105. The first metal electrode 101 in the first embodiment shown in FIGS. 1 and 2 has a cylindrical shape having a diameter of 2 mm. The diameter and the shape are examples of the first metal electrode 101, and the diameter of the first metal electrode 101 may be larger than 2 mm. The shape of the first metal electrode 101 may be not limited to the cylindrical shape and may be, for example, an arbitrary shape such as a cuboid shape or a sheet shape. The first metal electrode 101 may be formed from a material such as, iron, tungsten, copper, aluminum, platinum, or an alloy including one or plural metal(s) selected from these metals.

<Second Metal Electrode>

At least a part of the second metal electrode 103 also is disposed in the reaction tank 107 into which the liquid 108 is filled. The position for the second metal electrode 103 to be disposed at may not be limited as above, and the second metal electrode 103 may be disposed at any position of the reaction tank 107. The second metal electrode 103 may be formed from an electrically conductive metal material. For example, similarly to the first metal electrode 101, the second metal electrode 103 may be formed from a material such as iron, tungsten, copper, aluminum, platinum, or an alloy including one or plural metal(s) selected from these metals. Though the second metal electrode 103 is configured to be disposed in the reaction tank 107 in the first embodiment, the position may not be limited to this. The second metal electrode 103 may be disposed in the liquid 108.

<Insulator>

The insulator 102 is disposed such that the space 114 is formed around the first metal electrode 101. The insulator 102 is provided with the opening portion 113 causing the inside of the reaction tank 107 and the space 114 to communicate with each other. The insulator 102 is disposed such that the insulator 102 surrounds the first metal electrode 101 through the space 114, and includes the opening portion 113 at a position at which the insulator 102 is in contact with the liquid 108. The position at which the insulator 102 is in contact with the liquid 108 may be, for example, in a portion of the insulator 102 disposed (immersed) in the liquid 108. The insulator 102 in the first embodiment shown in FIGS. 1 and 2 has a tube shape having an inner diameter of 3 mm and an outer diameter of 5 mm, and is provided with the one opening portion 113 having a diameter of 0.7 mm. The size and the shape of the insulator 102 are not limited to the above, and may be an arbitrary size and an arbitrary shape as long as the space 114 can be formed around the first metal electrode 101. For example, the diameter of the opening portion 113 in the first embodiment is set to be 0.7 mm in the first embodiment. However, the diameter is not limited to this and may be an arbitrary size equal to or smaller than 2 mm. Plural opening portions 113 may be provided with the insulator 102. Though the position of the opening 113 is not especially limited, the opening 113 may be disposed, for example, at an upper-side position (on the upper side as shown) in the vertical direction relative to a side face of the insulator 102. As above, setting the opening orientation of the opening portion 113 to be upward enables prevention of bubble clogging of the bubbles 112 in the opening portion 113. The insulator 102 may be formed from a material such as, aluminum oxide, magnesium oxide, yttrium oxide, an insulating plastic, glass, or quartz.

<Holding Block>

The holding block 105 is connected to an end of each of the first metal electrode 101 and the insulator 102. The holding block 105 may have a structure to seal such that the liquid 108 does not leak in the connection portion with the first metal electrode 101 and the insulator 102. For example, a structure may be employed to screw the first metal electrode 101 and the insulator 102 to the holding block 105. The sealing structure is not limited to this and may be an arbitrary structure.

<Power Supply>

The power supply 106 is disposed between the first metal electrode 101 and the second metal electrode 103. The power supply 106 applies a high voltage of 4 kV to 10 kV at a frequency of 1 to 100 kHz between the first metal electrode 101 and the second metal electrode 103. The power supply 106 can apply a pulse voltage or an AC voltage and, for example, the voltage waveform may be any one of a pulse form, a sine half-wave form, and a sine wave form. A higher current value is more preferable. However, when the current value is set to be too high, the electric power is used such that not only the liquid 108 in the space 114 but also the liquid 108 in the reaction tank 107 are heated. Therefore, the efficiency of the plasma generation is actually lowered. Based on the above reason, the current value is set to be lower than or equal to 3 A in the first embodiment. When the current value is lower than 1 mA, a long time period is necessary for vaporizing the liquid 108 in the space 114 and, therefore, preferably, the current value is in a range from 1 mA to 3 A.

<Treatment Tank>

The treatment tank 109 is connected to the reaction tank 107 through, the circulating pump 110 and the pipe 111, for example. The treatment tank 109 is usable for, for example, a water clarification device, an air-conditioner, a humidifier, a washing machine, an electric razor washer, a dish washer, a lavatory basin, and a hydroponic culture water and nourishing solution circulation tank, etc. The treatment tank 109 may be grounded to prevent any electrification.

<Reaction Tank>

The volumes of the reaction tank 107 and the treatment tank 109 total about 600 ml. As above, the liquid 108 in the reaction tank 107 is circulated by the circulating pump 110 and the pipe 111. The circulation velocity of the liquid 108 is set to a proper value from the decomposition velocity of the substance to be decomposed by the plasma 104 and the volume of the reaction tank 107.

According to the configuration of the liquid treatment device 100 of the first embodiment, the presence of the space 114 between the first metal electrode 101 and the insulator 102, and the diameter of the opening portion 113 disposed in the side face of the insulator 102 are advantageous for efficiently generating the plasma and treating the liquid in a short time period.

The employment of the structure to seal to prevent any leakage of the liquid 108 at the one end of each of the first metal electrode 101 and the insulator 102 is also advantageous for the gas blocks to be released only from the opening portion 113 of the insulator 102.

Electrodes each made from a metal material are used as the first metal electrode 101 and the second metal electrode 103 in the first embodiment. However, the material is not limited to this. The first electrode and the second electrode may be used that are each made from a material other than a metal material such as carbon.

<Liquid Treatment Method>

A liquid treatment method using the liquid treatment device 100 according to the first embodiment is described.

Before a liquid treatment is started, the space 114 formed between the first metal electrode 101 and the insulator 102 is filled with the liquid 108. From this state, the power supply 106 applies the voltage between the first metal electrode 101 and the second metal electrode 103 to heat the liquid 108 in the space 114.

The temperature of the liquid 108 in the space 114 is increased by the electric power input from the first metal electrode 101. This temperature increase vaporizes the liquid 108 in the space 114 and a gas is generated. The gas gathers in the space 114 and then the gas is formed to blocks. Each of the gas blocks is released into the liquid 108 in the reaction tank 107 from the opening portion 113 arranged in the insulator 102 due to a pressure difference between the pressure in the space 114 and the pressure of the reaction tank 107.

When the gas block passes through the opening portion 113, the liquid in the opening portion is displaced by the gas due to the gas block and the first metal electrode 101 and the second metal electrode 103 electrically conducting with each other by the liquid are insulated from each other. At this time, the high voltage from the power supply 106 is applied to the gas block present in the opening portion 113, and a discharge is generated due to concentration of the electric field. As a result, the plasma 104 is generated in the gas block. Once the plasma 104 is generated, the plasma 104 is continuously and consecutively generated, and the gas block including the plasma 104 is released from the opening portion 113 of the insulator 102 toward the liquid 108 in the reaction tank 107. The plasma 104 overhangs in the liquid 108 of the reaction tank 107 from the opening portion 113 of the insulator 102.

A part of the gas block including the overhanging plasma 104 is separated from the gas block and the plural bubbles 112 are formed. The bubbles 112 are diffused in the liquid 108 in the reaction tank 107. The plural bubbles 112 include bubbles each having a diameter equal to or smaller than one micrometer, and the liquid treatment device 100 according to the first embodiment of the present disclosure also has a function of generating the micro bubbles. The bubbles 112 differ from the ordinary micro bubbles and the inside of each of the bubbles 112 includes electrons, ions, or radicals generated by the plasma 104. The liquid treatment device 100 according to the first embodiment of the present disclosure disinfects the liquid 108 and/or decomposes the chemical substances included in the liquid 108, using the bubbles 112.

[Effect (about Bubbles)]

An effect of the bubbles 112 according to the liquid treatment device 100 according to the first embodiment of the present disclosure is described. As above, the bubbles 112 formed by the liquid treatment device 100 according to the first embodiment includes the bubbles each having the diameter equal to or smaller than one micrometer. The bubbles 112 differ from the ordinary micro bubbles and the inside of each of the bubbles 112 includes reactive species such as electrons, ions, or radicals generated by the plasma 104. Therefore, the bubbles 112 achieve an effect that the bubbles 112 have a higher disinfection capacity and a higher capacity to decompose chemical substances than those of the ordinary micro bubbles. Therefore, according to the liquid treatment device 100 according to the first embodiment of the present disclosure, persistent substances can be decomposed such as ammonia and acetic acid that are difficult to decompose using the ordinary micro bubbles.

[Effect (about Space between First Metal Electrode and Insulator)]

An effect of the space 114 formed between the first metal electrode 101 and the insulator 102 is described. The space 114 has a function of producing the gas by vaporizing the liquid 108. According to the liquid treatment device 100 of the first embodiment, a current flowing from the first metal electrode 101 which heats the liquid 108 in the space 114 and, thereby, the liquid 108 in the space 114 is vaporized to generate the gas.

The configuration of the conventional device shown in FIG. 10, that is, the configuration having the first metal electrode 101 and the insulator 102 disposed in contact with each other (the configuration without the space 114) is described. In this case, the first metal electrode 101 is directly in contact with the liquid 108 in the reaction tank 107 through the opening portion 113 of the insulator 102. As a result, even when the power supply 106 applies the voltage between the first metal electrode 101 and the second metal electrode 103, a current flows directly from the first metal electrode 101 to the liquid 108 in the reaction tank 107 and diverges. Therefore, the liquid 108 cannot be vaporized. When forming a local vaporization state in the vicinity of the first metal electrode 101 is attempted using the configuration without the space 114, it is necessary to dispose the second metal electrode 103 such that the distance between the electrodes of the first metal electrode 101 and the second metal electrode 103 is a predetermined distance (several mm). The electric field needs to be high to generate the plasma 104, and the diameter of the first metal electrode 101 needs to be small. Employment of such a configuration enables the liquid 108 in the vicinity of the first metal electrode 101 to be vaporized using the conventional device shown in FIG. 10 and also enables the plasma 104 to be generated. However, this configuration has a disadvantage that the position of the second metal electrode 103 is limited, and the current flows in the overall inside of the reaction tank 107, that is, in the overall liquid 108 resulting in diffusion of the current. Therefore, high electric power equal to or higher than 250 W is necessary to generate the bubbles by vaporizing the liquid 108 in the vicinity of the first metal electrode 101 and generate the plasma 104 in each of the bubbles. According to the findings of the inventors, when the applied electric power is increased, more energy tends to be consumed to heat the liquid than the energy injected into the plasma and the efficiency tends to be low. Therefore, the conventional configuration shown in FIG. 10 (the configuration without the space 114) has a disadvantage that the plasma 104 cannot efficiently be generated.

According to the liquid treatment device 100 of the first embodiment, the first metal electrode 101 and the insulator 102 are configured to have the space 114 therebetween and, thereby, the plasma 104 can efficiently be generated with low power consumption by generating the gas by vaporizing the liquid 108 in the space 114. For example, assuming that the length of the insulator 102 is 5 cm, the electric power is about 0.1 W necessary for increasing the temperature of water from 20° C. to 100° C. in 1 minute. Even when the temperature increases in 1 second, the necessary electric power is about 7 W, and the plasma 104 can be generated with significantly less electric power as compared to the necessary electric power (equal to or higher than 250 W) for the conventional configuration shown in FIG. 10 (the configuration without the space 114).

According to the first embodiment, the distance is not limited between the first metal electrode 101 and the second metal electrode 103 and, therefore, the second metal electrode 103 can be disposed at an arbitrary position.

According to the first embodiment, a significant advantage is present that, as compared to the electrodes in the conventional device, the electric field applied to the gas arriving in the opening portion can be controlled by the diameter of the opening portion and, therefore, the geometric dimensions of the first metal electrode 101 does not influence the generation efficiency of the plasma. Therefore, the diameter of the first metal electrode 101 can be increased and, therefore, the durability of the first metal electrode 101 can be improved.

[Effect (Decomposition Velocity)]

An effect (decomposition velocity) of the liquid treatment device 100 of the first embodiment of the present disclosure is described. To measure the decomposition velocity of the liquid treatment device 100 according to the first embodiment, an indigo carmine (methylene blue) water solution at a concentration of 10 mg/L was used as a model of the liquid to be treated. Indigo carmine is an organic substance soluble in water, and is often used as a model for polluted water treatment.

In the liquid treatment device 100 according to the first embodiment, the OH radicals are generated by diffusing the bubbles 112 each including the plasma 104, in the liquid 108. The OH radicals act on indigo carmine, sever the intramolecular bonds, and, thereby, decompose indigo carmine molecules. As generally known, the oxidation potential of an OH radical is 2.81 eV and is higher than the oxidation potentials of ozone, hydrogen peroxide, and chlorine. Therefore, the OH radical can decompose not only indigo carmine but also many organic substances.

The decomposition velocity of an indigo carmine molecule can be evaluated by the absorbance in the water solution. It is generally known that the blue color of the indigo carmine water solution fades away when the indigo carmine molecules are decomposed, and the indigo carmine water solution becomes transparent when the molecules are completely decomposed. This is because: the absorption wavelength is 608.2 nm by the carbon double bond (C═C) present in the indigo carmine molecule; the C═C bond cleaves due to the decomposition of the indigo carmine molecule; and the absorption of the light of 608.2 nm is lost. Therefore, the decomposition velocity of the indigo carmine molecule was acquired by measuring the absorbance of the light having the wavelength of 608.2 nm using a UV-visible light spectro-photometer. The measurement was executed using the liquid treatment device 100 according to the first embodiment as an EXAMPLE and the conventional device described in Patent Literature 1 as a comparative example.

The EXAMPLE is described. The EXAMPLE is the liquid treatment device 100 according to the first embodiment. The first metal electrode 101 has the cylindrical shape having the diameter of 2 mm. The insulator 102 has the tube shape having the inner diameter of 3 mm and the outer diameter of 5 mm. The opening portion 113 arranged in the insulator 102 has the diameter of 0.7 mm. The power supply 106 applies a pulse voltage at a frequency of 30 kHz having a peak voltage of 5 kV and a pulse width of 1 μs. The volumes of the reaction tank 107 and the treatment tank 109 total 600 ml.

Figure 3:
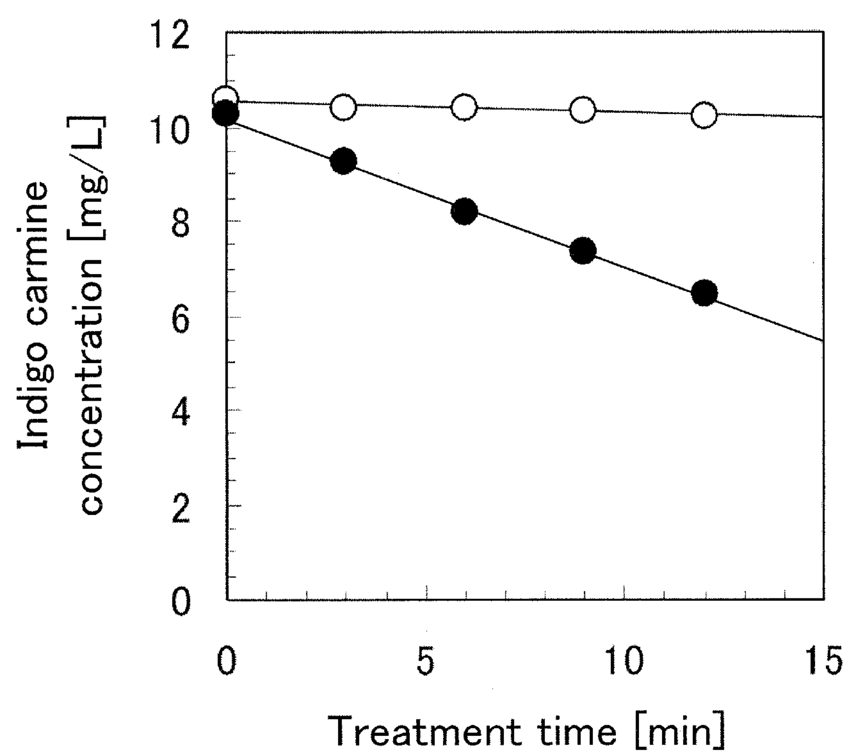
FIG. 3 is a diagram of a comparison of a decomposition amount of an indigo carmine water solution to a treatment time period between the embodiment of the present disclosure and a comparative example.

FIG. 3 is a diagram comparing the decomposition concentration of the indigo carmine water solution to a treatment time period between the EXAMPLE and the comparative example. Black dots shown in FIG. 3 indicate the EXAMPLE and white dots indicate the comparative example. As shown in FIG. 3, according to the EXAMPLE, the time period necessary for completely decomposing the indigo carmine of about 10 mg/L is about 32 minutes. On the other hand, according to the comparative example, the time period necessary for completely decomposing the indigo carmine of about 10 mg/L is about 401 minutes. Therefore, the liquid treatment device 100 according to the first embodiment of the present disclosure achieves the decomposition velocity that is 10 or more times faster compared to that of the conventional device. Based on this, according to the liquid treatment device 100 according to the first embodiment, the plasma 104 can efficiently be generated and the treatment time period of the liquid 108 can significantly be reduced.

[Effect (Diameter of Opening)]

The relation between the diameter of the opening 113 of the insulator 102 in the first embodiment of the present disclosure and the decomposition velocity of the indigo carmine water solution is described.

Figure 4:
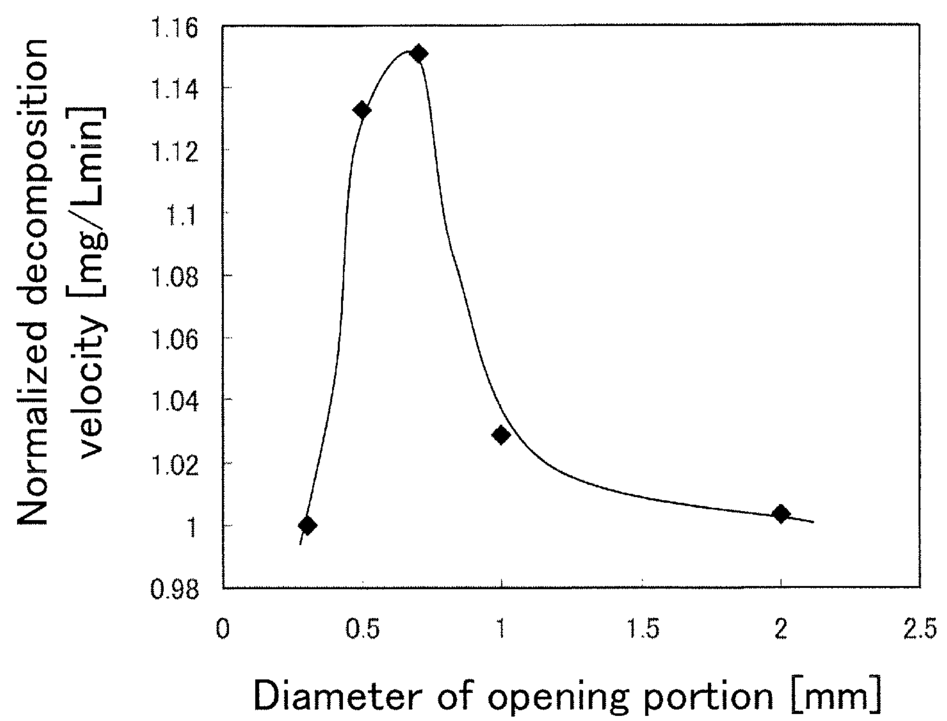
FIG. 4 is a diagram of a relation between a diameter of an opening of an insulator in the first embodiment of the present disclosure and a normalized decomposition velocity of the indigo carmine water solution.

FIG. 4 is a diagram of the decomposition velocity to the opening portion 113 of the insulator 102 in the first embodiment of the present disclosure. The measurement of the decomposition velocity was executed using the indigo carmine water solution. Black rhombic dots shown in FIG. 4 indicate the measurement result of the decomposition velocity to the diameter of the opening portion 113 in the first embodiment. As shown in FIG. 4, the decomposition velocity of the indigo carmine water solution is high with the diameter of the opening portion 113 in a range from 0.3 to 2 mm, and a region for the decomposition velocity to be maximal is present with the diameter in a range from 0.5 mm to 0.7 mm. This is because the electric field becomes higher inversely proportional to the square of the diameter of the opening portion 113 and, therefore, the electric field becomes higher as the diameter of the opening portion 113 become smaller. Therefore, when the diameter of the opening portion 113 is set to be smaller, the discharge tends to more easily be caused and the plasma 104 can more efficiently be generated. As a result, the decomposition velocity of the indigo carmine becomes high. On the other hand, after the maximal value of the decomposition velocity (a range from 0.5 mm to 0.7 mm) as the border, the decomposition velocity becomes lower as the diameter of the opening 113 is set to further be smaller. This is because the volume of the plasma becomes a factor to determine the decomposition velocity. When the diameter of the opening portion 113 becomes small, the volume of the plasma 104 overhanging in the reaction tank 107 become small and the number density of the radicals generated in the plasma 104 becomes low. Therefore, it is considered that the decomposition velocity of indigo carmine becomes low. The volume of the plasma 104 is proportional to the cube of the diameter of the opening portion 113. When the diameter of the opening 113 becomes small, the volume of the plasma 104 also becomes small and, therefore, an aspect is shown that the decomposition velocity of indigo carmine is steeply decreased after the maximal value as the border.

Therefore, preferably, the diameter of the opening portion 113 of the insulator 102 is in the range from 0.3 to 2 mm and, more preferably, is in the range from 0.5 mm to 0.7 mm. In the liquid treatment device 100 according to the first embodiment of the present disclosure, when the diameter of the opening portion 113 is within the above ranges, the plasma 104 can efficiently be generated.

[Effect (OH Radical Generation])

An effect (OH radical generation) of the liquid treatment device 100 according to the first embodiment of the present disclosure is described.

It is said that the life of an OH radical generally is several us to several ms. Based on this, even when an OH radical is generated, the OH radical immediately vanishes, and measuring an OH radical is usually difficult.

In the liquid treatment device 100 according to the first embodiment of the present disclosure, the OH radicals were measured using an ESR (Electron Spin Resonance) method. In the case of measuring OH radical by use of ESR method, a method for measuring the OH radicals by coupling a spin-trapping agent called DMPO with the OH radicals. According to this method, the OH radicals can quantitatively be measured.

Two methods are present as types of measurement method using the addition of DMPO. One is a method according to which: DMPO is added in advance to the water being treated such that DMPO immediately captures the OHs when the OH radicals are generated; and a signal of OH radicals is measured. This method has a significant advantage that the OH radicals can be measured even with the short life of the OH radicals when a specific amount of the OH radicals are generated, because DMPO is included in advance in the water being treated. However, in the case such as the first embodiment, the method has disadvantages that the correct amount of the OH radicals cannot be measured because DMPO itself is decomposed by the plasma and that, when the amount of the liquid is increased, the amount of added DMPO needs to be increased corresponding thereto.

The other is a method that the water being treated is treated by the liquid treatment device for a specific time period and, thereafter, the generation of the plasma is stopped. The method takes out a specific amount of the water being treated at intervals of specific time periods setting the time point at which the plasma is stopped as the origin, and the OH radicals are measured after adding DMPO thereto. This method has a fatal disadvantage that, when the life of each of the OH radicals is short, the OH radicals cannot be measured as far as a special sampling device is prepared. However, an advantage thereof is that any worry is unnecessary for problems of decomposition of DMPO itself and its amount to be added.

In the liquid treatment device 100 according to the first embodiment of the present disclosure, the OH radicals were measured using the latter method of the above two.

Figure 5:
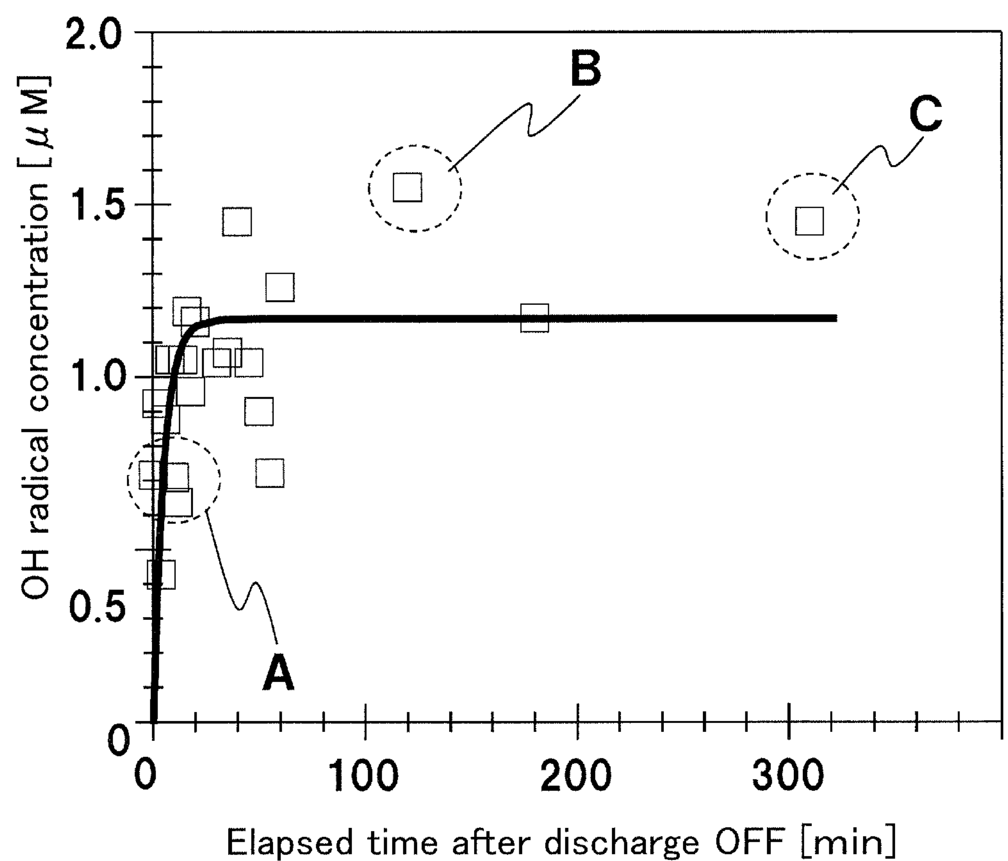
FIG. 5 is a diagram of a measurement result of an OH radical concentration in a liquid treated by the liquid treatment device according to the first embodiment of the present disclosure.

FIG. 5 is a diagram of a result of the measurement of the OH radicals in the liquid 108 treated by the liquid treatment device 100 of the first embodiment of the present disclosure. As shown in FIG. 5, the OHs are generated even when the plasma 104 is stopped (0 min) and, when about 10 min elapsed, the maximal OH radical concentration is reached. Thereafter, the OH radicals repeat their generation and vanishing, and it was confirmed that the OH radicals were present in the liquid 108 up to at least about 300 min. A solid line in FIG. 5 is fitted using a rate equation. The rate equation is described below.

$$\frac{\partial N_{OH}}{\partial t} = G - \frac{N_{OH}}{\tau} \quad \text{[Equation 1]}$$

$$N_{OH} = G\tau\left(1 - \exp\left(-\frac{t}{\tau}\right)\right) \quad \text{[Equation 2]}$$

In the above: "$N_{OH}$" is the OH radical concentration (μM); "G" is the amount of OH radicals generated in each 1 min (μM/min); and "τ" is the life of a single OH radical (min). "G" is 0.2 μM/min.

From the equations, the life τ of a single OH radical can be calculated to be about 5 min.

As above described, the life of an OH radical is generally short (several μs to several ms). However, according to the liquid treatment device 100 according to the first embodiment of the present disclosure, it is possible to achieve a long life of the OH radicals which have not been achieved with the conventional device. As a result, the decomposition velocity of the indigo carmine water solution can drastically be improved.

As above described, according to the liquid treated by the liquid treatment device 100 according to the present disclosure (hereinafter, "plasma treated water), the OH radicals in the liquid generated by energizing the liquid (the discharge) can continuously be present even after the energizing is stopped. The reason for this is described below.

When the liquid is treated by the liquid treatment device 100 according to the present disclosure, hydrogen peroxide is generated together with the OH radicals. Therefore, even after the energizing is stopped, the OH radicals in the plasma treated water decompose hydrogen peroxide to newly generate OH radicals. As a result, the plasma treated water of the present disclosure includes therein the OH radicals capable of being continuously present in the liquid even after the energizing is stopped. The configuration of the plasma treated water of the present disclosure is described in detail below.

The inventors measured the hydrogen peroxide concentration in the plasma treated water using a titration method and, as a result, it turned out that the hydrogen peroxide concentration in the plasma treated water was $10^{-7}$ to $10^{-5}$ M. The hydrogen peroxide concentration in the liquid treated by the conventional liquid treatment device was higher than the hydrogen peroxide concentration in the plasma treated water of the present disclosure (at least higher than $10^{-5}$ M).

The relation between the hydrogen peroxide concentration and the amount of generated OH radicals is described.

Figure 6:
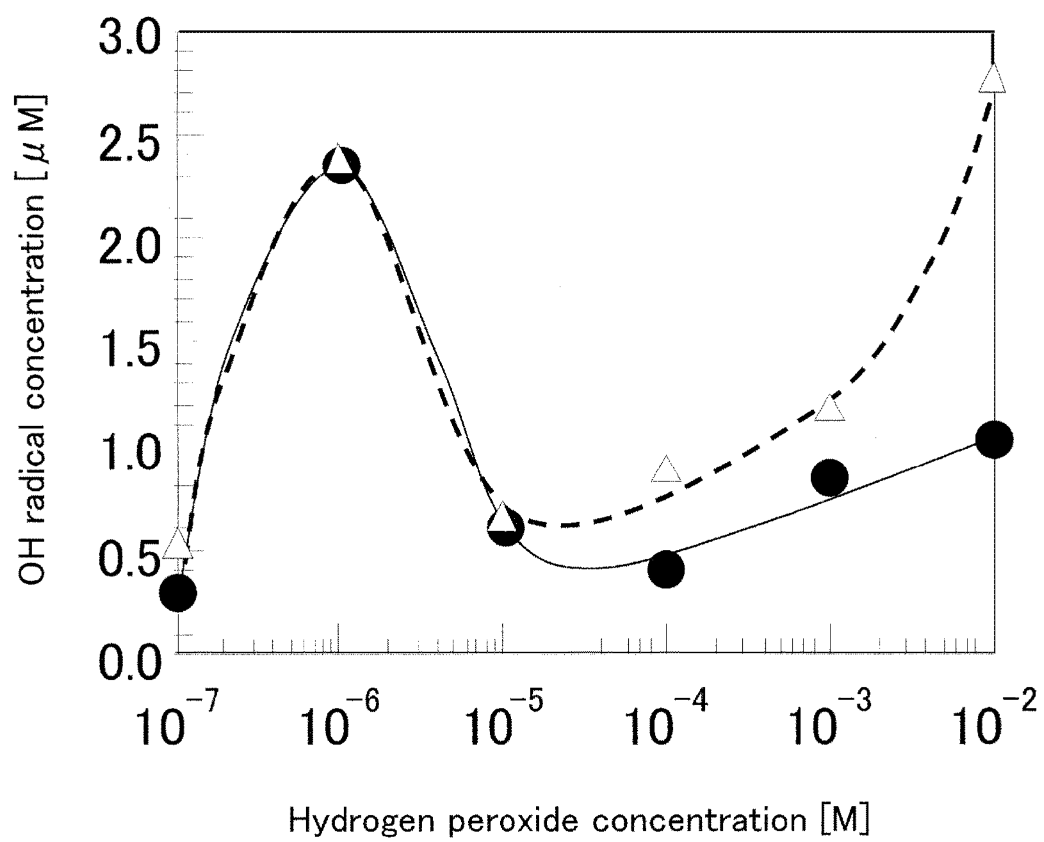
FIG. 6 is a diagram of a relation between a hydrogen peroxide concentration and the OH radical concentration.

FIG. 6 shows results of a research on the relation between the hydrogen peroxide concentration and the OH radical concentration using ESR. In FIG. 6, white triangles indicate a result acquired when a UV lamp was applied to the liquid, and black triangles indicate a result acquired when no UV lamp was applied to the liquid.

As shown in FIG. 6, when the hydrogen peroxide concentration is in the range from $10^{-7}$ to $10^{-5}$ M and, especially, in the range from $0.2\times10^{-7}$ to $0.6\times10^{-5}$ M, regardless of the presence or the absence of the application of the UV lamp, a region for the OH radical concentration to be maximal (a range for the OH radical concentration to be 1.0 μM to 2.4 μM) is present. On the other hand, in the case where the hydrogen peroxide concentration is higher than $10^{-5}$ M, when no UV lamp is applied, the OH radical concentration is low (in a range from 0.4 μM to lower than 1.0 μM). When the UV lamp is applied, it seems that the OH radical concentration becomes high compared to the case without the application of the UV lamp. However, with the application of the UV lamp, when the hydrogen peroxide concentration is equal to or higher than $10^{-5}$ M, the OH radicals recombine with time passage and the OH radicals in the liquid decrease. Therefore, when the hydrogen peroxide concentration is equal to or higher than $10^{-5}$ M, the OH radical concentration with the application of the UV lamp is finally reduced to the OH radical concentration at about the same level of the OH radical concentration without the application of the UV lamp (the range from 0.4 μM to lower than 1.0 μM).

The recombination of OH radicals is described.

When hydrogen peroxide is decomposed basically by application of a UV lamp, at most two OH radicals can be generated from one hydrogen peroxide. Thereafter, the number of the OH radicals becomes fewer than two because the OH radicals recombine that are generated associated with the decomposition of hydrogen peroxide caused by the application of the UV lamp. As above described, when hydrogen peroxide is decomposed by the application of the UV lamp, the OH radicals in the liquid decrease with time by the recombination of the OH radicals.

As above described, when the hydrogen peroxide concentration is in the range from $10^{-7}$ to $10^{-5}$ M, the OH radical concentration does not vary even in the comparison between the case with the application of the UV lamp and the case without the application thereof. When the hydrogen peroxide concentration is in the range from $10^{-7}$ to $10^{-5}$ M, the OH radicals can be generated even without the application of the UV lamp and the decrease of the OH radicals can be prevented that is caused by the recombination of the OH radicals. On the other hand, when the hydrogen peroxide concentration is higher than $10^{-5}$ M, the OH radicals cannot efficiently be generated without the application of the UV lamp. However, even with the application of the UV lamp, the OH radicals decrease with time due to the recombination of the OH radicals and, therefore, the OH radical concentration consequently is reduced.

Based on the above, it can be seen that, when the hydrogen peroxide concentration is in the range from $10^{-7}$ to $10^{-5}$ M and, especially, in the range from $0.2\times10^{-7}$ to $0.6\times10^{-5}$ M, even without the application of the UV lamp, the OH radicals can efficiently be generated for the OH radical concentration in the range from 1.0 to 2.4 μM.

As above, the plasma treated water of the present disclosure includes hydrogen peroxide at the hydrogen peroxide concentration in the range from $10^{-7}$ to $10^{-5}$ M. The plasma treated water of the present disclosure can efficiently generate OH radicals at the OH radical concentration in the range from 1.0 to 2.4 μM even without the application of the UV lamp especially when the hydrogen peroxide concentration is in the range from $0.2\times10^{-7}$ to $0.6\times10^{-5}$ M. According to this configuration, the plasma treated water of the present disclosure can continuously generate the OH radicals by decomposition of hydrogen peroxide by the OH radicals even after the energizing is stopped. As a result, long-life OH radicals are present in the plasma treated water and the capacity to treat the liquid for a long time period can be retained. Therefore, the substances to be decomposed can efficiently be decomposed.

Figure 7:
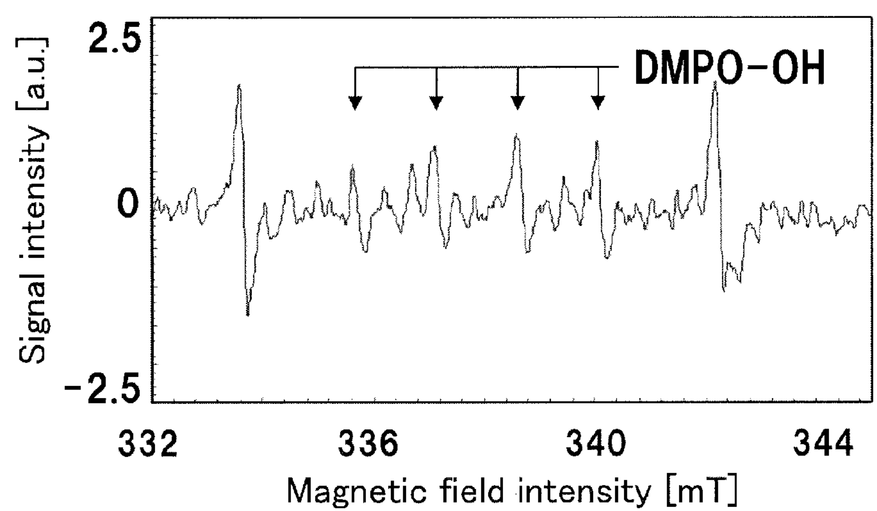
FIG. 7 is a diagram of a signal of DMPO-OH in the liquid at a time point “A” of FIG. 5.
Figure 8:
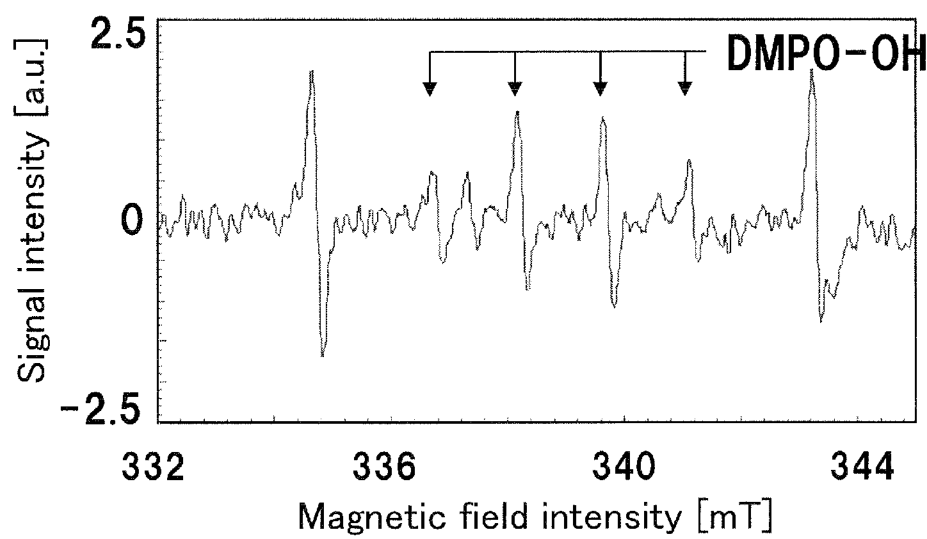
FIG. 8 is a diagram of the signal of DMPO-OH in the liquid at a time point “B” of FIG. 5.
Figure 9:
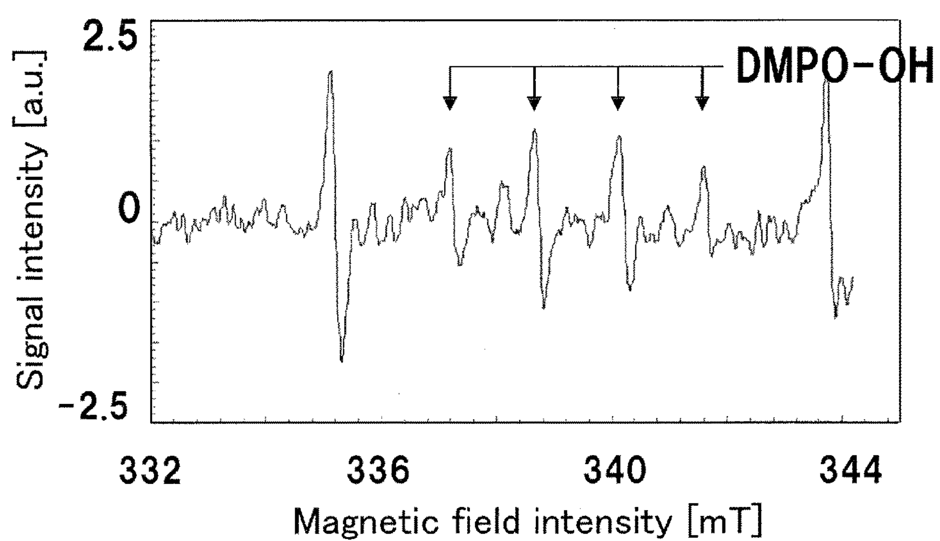
FIG. 9 is a diagram of the signal of DMPO-OH in the liquid at a time point “C” of FIG. 5.

Specific DMPO-OH signals at time points A to C of FIG. 5 after the plasma 104 (discharge) is stopped are described with reference to FIGS. 6 to 8. FIG. 7 is a diagram of the DMPO-OH signal in the liquid 108 at the time point "A" of FIG. 5. FIG. 8 is a diagram of the DMPO-OH signal in the liquid 108 at the time point "B" of FIG. 5. FIG. 9 is a diagram of the DMPO-OH signal in the liquid 108 at the time point "C" of FIG. 5. "A" is the time point immediately after the discharge is stopped. "B" is the time point 120 min after the discharge is stopped. "C" is the time point 310 min after the discharge is stopped. As shown in FIGS. 7 to 9, at all of the time points A to C, four ESR spectra at 1:2:2:1 are observed with their hyperfine coupling constants a(N) and a(H) of both 1.49 mT that indicate the split width split by the hyperfine structure. The hyperfine coupling constant is one of the measurable parameters using the ESR method, and the presence of the radicals can be known from the measured ESR spectra and the hyperfine coupling constant. From the observed ESR spectra, the presence of DMPO-OH adducts can be known that is the substance generated by a spin trapping reaction of DMPO and the OH radicals.

As shown in FIG. 7, the DMPO-OH adducts start to be observed immediately after the discharge stops. As shown in FIG. 8, the signal intensity of the DMPO-OH adducts is higher 120 min after the discharge stops than that immediately after the discharge stops. As shown in FIG. 9, 310 min after the discharge stops, the DMPO-OH adduct signal can still be recognized. As above described, according to the liquid treatment device 100 according to the first embodiment of the present disclosure, the DMPO-OH adduct signal can be recognized for a long time period. It can be seen that the long-life OH radicals are generated in the liquid 108.

Therefore, according to the liquid treatment device 100 of the first embodiment of the present disclosure, the long-life OH radicals can be generated in the liquid 108 and, therefore, the liquid 108 can be treated in a short time period compared to the conventional device.

As above described, according to the liquid treatment device 100 according to the first embodiment of the present disclosure, as compared to the conventional device, the plasma 104 can efficiently be generated and the long-life OH radicals can be generated and, therefore, the liquid 108 can be treated in a short time period. Concurrently, the life and the presence time period of the OH radicals are long and, therefore, an active plasma treated water can be acquired that has a capacity of treating the liquid for a long time period after the energizing (the discharge) is stopped. This fact is a phenomenon first found by the inventors and is not known until that time. This corresponds to the effect that: no additional energy is necessary; only the energy is sufficient that is input in the stage of generating the plasma treated water; and the treatment efficiency is improved from the viewpoint of the liquid treatment. No restriction is imposed on the distance between the first metal electrode 101 and the second metal electrode 103 and, therefore, the second metal electrode 103 can be disposed at an arbitrary position in the reaction tank 107. As compared to the electrode of the conventional device, the diameter of the first metal electrode 101 can be increased and, therefore, the durability of the electrode can be improved.

According to the liquid treatment device 100 according to the first embodiment, the gas is generated by vaporizing the liquid 108 and the plasma 104 is generated in the gas and, thereby, purer OH radicals can be generated. As a result, the liquid can be treated in a short time period.

The electric field is concentrated in the vicinity of the opening portion 113 by setting the diameter of the opening 113 disposed in the insulator 102 in the first embodiment to be 0.3 mm to 2 mm and, thereby, the discharge can efficiently be caused. Setting the opening orientation of the opening portion 113 to be upward in the vertical direction for the side face of the insulator 102 enables prevention of the clogging of the bubbles in the vicinity of the opening portion 113. A plurality of opening portions 113 may be arranged at the insulator 102. As a result, the plasma 104 can efficiently be generated from the vicinity of the opening portions 113.

The one end of each of the first metal electrode 101 and the insulator 102 in the first embodiment has a sealing structure, for example, a screw clamp structure and, thereby, any leakage of the liquid 108 is prevented at the end of the connection between the first metal electrode 101 and the insulator 102. Thereby, the gas blocks are released only from the opening portion 113 of the insulator 102 and, therefore, the plasma 104 can efficiently be generated.

The power supply 106 in the first embodiment supplies an electric current whose current value is lower than or equal to 3 A, thereby, can vaporize the liquid 108 only in the space 114 formed between the first metal electrode 101 and the insulator 102, and can efficiently generate the plasma 104 with low electric power consumption.

According to the liquid treatment device 100 according to the first embodiment, the reaction tank 107 and the treatment tank 109 are connected by the circulating pump 110 and the pipe 111 and, thereby, a large volume of liquid 108 can be treated. The treatment tank 109 is grounded and, thereby, any electrification can be prevented.

The treatment tank 109 in the first embodiment can be used in various electric appliances by using the treatment tank 109 in a water clarification device, an air-conditioner, a humidifier, a washing machine, an electric razor washer, a dish washer, a lavatory basin, or a hydroponic culture water and nourishing solution circulation tank, etc.

The plural liquid treatment devices 100 in the first embodiment may also be used to form an array-type device. As above described, a further large volume of liquid 108 can be treated by setting the plural liquid treatment devices 100 side by side. According to this device configuration, the treatment tank 109 can be used as a water clarification device, an air-conditioner, a humidifier, a washing machine, an electric razor washer, a dish washer, a lavatory basin, or a hydroponic culture water and nourishing solution tank, etc.

The liquid treatment device 100 according to the first embodiment can be implemented in an arbitrary embodiment. For example, a liquid treatment method is present. According to the liquid treatment method: the voltage is applied between the first metal electrode 101 and the second metal electrode 103 by the power supply 106; and, thereby, the liquid 108 in the space 114 formed by the first metal electrode 101 and the insulator 102 is vaporized to generate the gas. The discharge caused in the gas enables efficient generation of the plasma. The gas is generated by vaporizing the liquid 108 and, therefore, purer OH radicals can be generated. As a result, the liquid 108 can be treated in a short time period.

The plasma treated water treated using the liquid treatment device 100 according to the first embodiment of the present disclosure includes hydrogen peroxide. Preferably, the hydrogen peroxide concentration in the plasma treated water is in the range from $10^{-7}$ to $10^{-5}$ M and, especially preferably, in the range from $0.2\times10^{-7}$ to $0.6\times10^{-5}$ M. According to this configuration, the plasma treated water of the present disclosure has the long-life OH radicals present therein and has the capacity of treating the liquid for a long time period even after the plasma stops (after the electric power is turned off).

The liquid treatment device according to the present disclosure can stably and highly efficiently generate the long-life OH radicals and, therefore, is useful as a water clarification device etc., for sewage treatment etc.

The invention claimed is:

1. A liquid treatment device comprising:

a first electrode disposed in a liquid;

a second electrode disposed in the liquid;

an insulator disposed surrounding the first electrode through a space, the insulator having an opening portion at a position in contact with the liquid; and a power supply that applies an AC voltage or a pulse voltage between the first electrode and the second electrode.

2. The liquid treatment device according to claim 1, wherein the opening portion has a diameter in a range from 0.3 mm to 2 mm.

3. The liquid treatment device according to claim 1, wherein the opening portion is arranged such that its opening orientation is upward in a vertical direction for a side face of the insulator.

4. The liquid treatment device according to claim 1, wherein a plurality of opening portions are arranged at the insulator.

5. The liquid treatment device according to claim 1, wherein an end of each of the first electrode and the insulator comprises a sealing structure.

6. The liquid treatment device according to claim 5, wherein the sealing structure is a screw clamp structure.

7. The liquid treatment device according to claim 1, wherein the power supply supplies a current having a current value of lower than or equal to 3 A.

8. The liquid treatment device according to claim 1, further comprising a reaction tank that the first electrode and the second electrode are disposed.

9. The liquid treatment device according to claim 8, further comprising a treatment tank that is connected to the reaction tank by a circulating pump and a pipe.

10. The liquid treatment device according to claim 9, wherein the treatment tank is grounded.

11. The liquid treatment device according to claim 9, wherein the treatment tank is one selected from a group of a water clarification device, an air-conditioner, a humidifier, a washing machine, an electric razor washer, a dish washer, a lavatory basin, and a hydroponic culture water and nourishing solution circulation tank.

12. A liquid treatment device comprising the plurality of liquid treatment device according to claim 1.

13. The liquid treatment device according to claim 12, further comprising a plurality of reaction tanks that the first electrode and the second electrode are disposed in each reaction tank.

14. The liquid treatment device according to claim 13, further comprising a treatment tank that is connected to the plurality of reaction tanks by a plurality of circulating pumps and a plurality of pipes.

15. The liquid treatment device according to claim 14, wherein the treatment tank is grounded.

16. The liquid treatment device according to claim 14, wherein the treatment tank is one selected from a group of a water clarification device, an air-conditioner, a humidifier, a washing machine, an electric razor washer, a dish washer, a lavatory basin, and a hydroponic culture water and nourishing solution circulation tank.

17. A liquid treatment device comprising:

a first electrode disposed in a liquid;

a second electrode disposed in the liquid;

an insulator disposed surrounding the first electrode through a space, the insulator having an opening portion at a position in contact with the liquid; and a power supply that applies a voltage between the first electrode and the second electrode, wherein:

a gas is generated by vaporizing the liquid in the space by applying the voltage between the first electrode and the second electrode by the electric power supply, and plasma is generated by causing an electric discharge when the gas is released from the opening portion into the liquid.

* * * * *